March 27, 1962     A. O. MONSON     3,027,533
GROUNDING COUPLING
Filed May 25, 1959
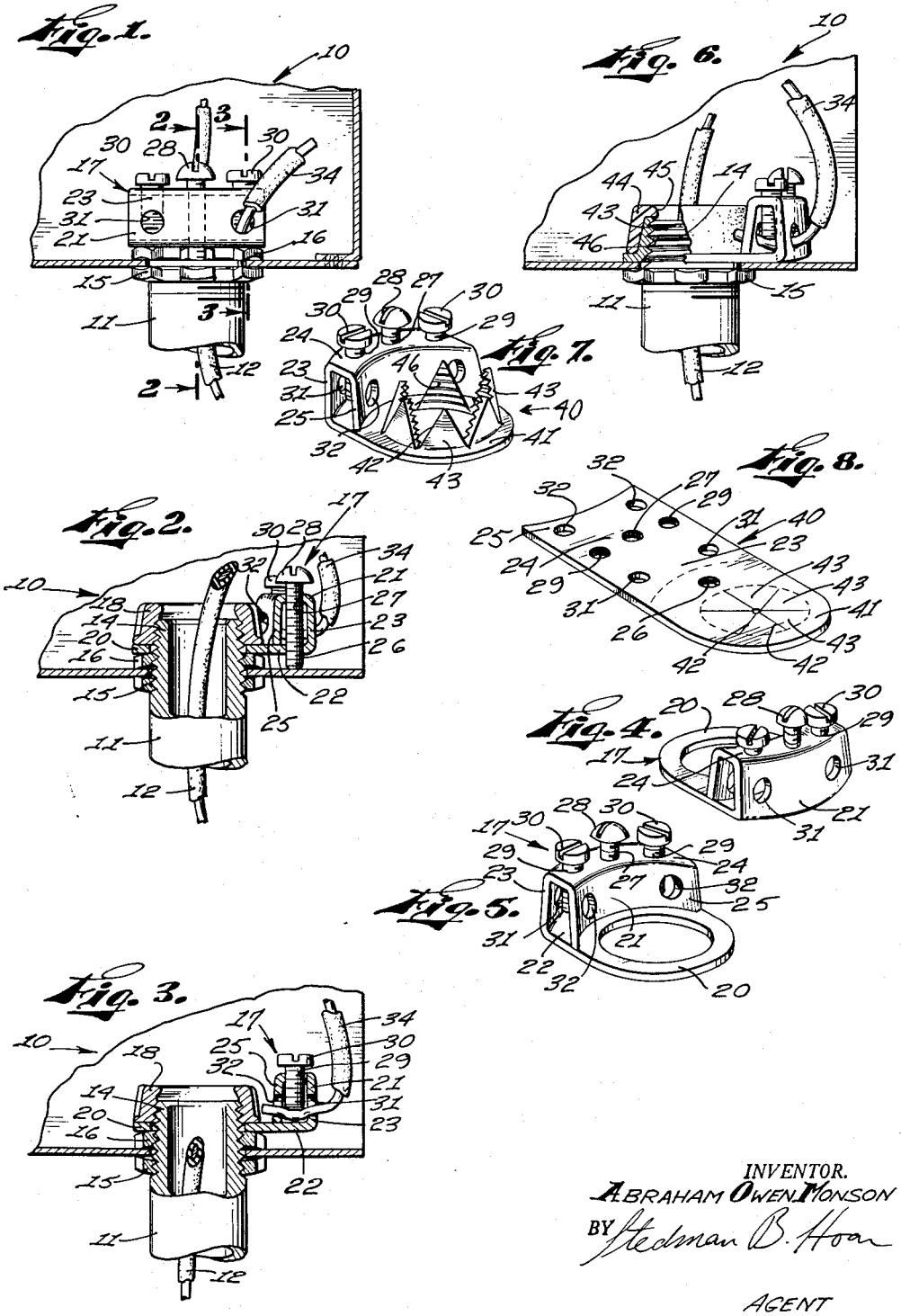
INVENTOR.
ABRAHAM OWEN MONSON
BY Stedman B. Hoar
AGENT

United States Patent Office 3,027,533
Patented Mar. 27, 1962

3,027,533
GROUNDING COUPLING
Abraham Owen Monson, 3300 Cerritos Ave.,
Long Beach, Calif.
Filed May 25, 1959, Ser. No. 815,522
2 Claims. (Cl. 339—14)

My invention relates to couplings for grounding electric conduits, and more particularly relates to a coupling for grounding to an outlet or junction box, or similar member, to which an electric wire is led through a nipple or other protective conduit.

Conventionally, grounding apparatus of the type described may include, in addition to a box and a wire entering the box, a threaded conduit through which the wire enters the box, a nut to be affixed to the end of the conduit within the box and a lock nut placed on the conduit outside the box and holding the box pressed against the first-mentioned nut. The first nut may have a smooth exterior, to prevent abrasion of the insulation of a wire, and is often termed a bushing. However, ordinances and insurance regulations usually require that there be a more definite grounding connection between box and conduit, and also that all conduits entering one box be grounded to each other. My invention has as a general object the provision of a grounding coupling meeting these ordinances and regulations and of low initial cost, sturdy in structure, easy to install, and positive in its grounding action.

A more specific object of my invention is to provide a grounding coupling having a set-screw for grounding to a box, which also tightens the whole coupling so that it is firmly held from jarring loose.

Another object of my invention is to provide a grounding coupling in which guide holes are provided for the grounding wires, so located that the wires are definitely placed where connector screws may bite into them, to obtain electric contact.

A further object of my invention is to provide, as an integral part of a grounding coupling, a washer or bushing having a wire-holding margin so shaped as to give added strength to the entire coupling.

Still another object of my invention is to provide a coupling which may include a novel bushing for preventing abrasion of insulation.

With the foregoing and other objects in view, I have illustrated preferred and modified forms of my invention in the accompanying drawing, in which:

FIG. 1 is an elevational view of my improved grounding coupling installed in a junction box, the box being shown in section and fragmentarily;

FIG. 2 is a view at right angles to that of FIG. 1, on the line 2—2 of FIG. 1, and partly in elevation;

FIG. 3 is a view similar to FIG. 2, on the line 3—3 of FIG. 1;

FIG. 4 is a perspective view of the coupling shown in FIGS. 1, 2, and 3;

FIG. 5 is another perspective view, at 180 degrees from the view of FIG. 4;

FIG. 6 is a view similar to FIG. 2, but showing a modification of my coupling with a plastic bushing;

FIG. 7 is a view similar to FIG. 5 showing the modification with the plastic bushing removed; and FIG. 8 is a perspective view of a blank punched to form the support for the bushing of FIGS. 6 and 7, with lines of bending shown in dotted line.

Having reference now to the details of the drawing, I have shown in FIGS. 1, 2, and 3, a box 10, such as a junction box to which a conduit 11 conducts a service wire 12. The end of the conduit 11 is threaded, as shown at 14 in FIGS. 2 and 3, and lock nuts 15 and 16 are threaded thereto, one outside the box 10 and the other inside the box 10, securing the conduit to the box. Above the lock nut 16 is the grounding coupling 17, subject matter of this invention, and a bushing nut 18 is threaded on the conduit end 14 above the grounding coupling 17. If space is at a premium in the box, and regulations permit, the upper lock nut 16 may be dispensed with, the bushing nut 18 serving its purpose.

The grounding coupling 17 comprises a strip of brass or other conductive metal, one end 20 of which is a flat annulus or washer, and the other end is a loop 21 recurved toward the annulus 20. The loop 21 is preferably as wide as the annulus portion of the coupling, and has a side 22 in extension of the plane of the annulus, a side 23 bent upward at right angles to the annulus, a side 24 recurvate toward the annulus and substantially parallel to the side 22, and a side 25 recurvate downward toward the side 22 and substantially parallel to the side 23. The parallel sides 23 and 25 are not straight but are curved so as to be concave towards the annulus 20; the curved structure adds greatly to the rigidity of the loop 21 and prevents the loop from being bent out of shape, which might otherwise easily happen, as the end of the side 25 is free and not secured to the side 22.

The side 22, in extension of the annulus 20, has a hole 26 and the opposite, recurvate side 24 has a hole 27 aligned with the hole 26. The holes 26 and 27 are for the purpose of receiving a set-screw 28, and therefore at least one of them is threaded. Preferably both of the holes 26 and 27 are threaded so that when the set screw 28 is threaded into them the sides 22 and 24 of the loop are held in fixed spatial relationship and can not easily be forced apart. Also in the recurvate side 24 are other holes 29, two such holes being shown, also threaded to receive connector screws 30. In the side 23 are holes 31, and in the side 25 are holes 32 aligned with the holes 31, the holes being so disposed that the connector screws 30 intersect said alignment.

In operation, it is required to ground the conduit 11 to the box 10, either directly or to another conduit entering the box and thence to the box. The service wire 12 will be led to its junction with other wires (not shown). A bare grounding wire 34 is passed through aligned holes 31 and 32, and the connector screw 30 respective to those holes is tightened on the wire 34 by means of the threads in the hole 29, as shown in FIG. 3. It will be observed that the aligned holes 31 and 32 place the wire 34 exactly where the connector screw 30 can bite into it, thus obviating the need of fumbling and feeling to insure a good ground. The other end of the wire 34 will be led, as usual to another coupling or to a connection on the box 10. The two sets of aligned holes 31 and 32 provide for a ground wire 34 from a similar set of holes on another coupling (not shown) and from the coupling 17 to the box 10. When the grounds have been completed the coupling 17 is tightened on the box 10 by means of the set-screw 28. The set-screw 28 not only presses firmly into the metal of the box 10 to insure a ground at that point of contact; it also firmly anchors the coupling 17 so that the coupling can not jar loose, by pushing upward on the loop end of the coupling and consequently binding the annulus 20 under the bushing nut 18 and against the threads of the conduit 11. This binding in turn insures grounding at the annulus end of the coupling.

In FIGS. 6 and 7, I have shown a modification in which the annulus of the coupling 40 forms a threaded part for securing the coupling to the conduit 11 and for receiving permanently a plastic insulating bushing which replaces the bushing nut 18. Instead of being formed like a flat washer, the annulus 41 is merely stamped with lines of cleavage 42, 42, 42 (FIG. 8) which cross at its center. The center is then bent at right angles to the annulus to form the peripheral fingers 43, 43, 43, shown in FIG. 7. A plastic bushing 44 is pressed down upon the outer faces of the fingers 43, in a hot and malleable condition, and allowed to cool. The plastic material fills the gaps between the fingers 43 and forms a smooth rim 45 above them. A screw thread 46 is then formed on the inner faces of the fingers 43 and on the intervening plastic material, by tapping. The thread 46 is engaged with the threaded end 14 of the conduit 11. The remainder of the coupling 40 is made with the same loop 21 and holes 26, 27, 29, 31, and 32 as in coupling 17, with lines of bending between sides of the loop 21 shown in dotted line in FIG. 8.

The disclosed embodiments are intended to be descriptive only, it being understood that the invention includes any constructive modification falling within the scope and spirit of the appended claims.

I claim:

1. A grounding coupling comprising a strip of electrically conductive metal having an annulus formed in one end for receiving the end of a conduit, the other end of said strip forming a four-sided loop having one side in extension of said annulus, said one side of said loop and the opposite side of said loop having aligned threaded holes, a set-screw threadedly engaged by both of said aligned holes and extending therethrough so as to cross said loop and extend beyond said one side, said opposite side having an additional threaded hole, a connector screw threaded in said additional hole so as to terminate within said loop, the other two sides of said loop having aligned holes for receiving a grounding-wire transversely of said loop, said last named holes being disposed so that said connector screw may intersect a wire passing through said last named holes.

2. A grounding coupling comprising a strip of electrically conductive metal having an annulus formed in one end for receiving the end of a conduit, the other end of said strip forming a four-sided loop having one side in extension of said annulus, said one side of said loop and the opposite side of said loop having aligned holes, screw means for engaging said strip around the peripheries of said aligned holes in said one side and said opposite side of said loop, said screw means extending through both of said aligned holes so as to cross said loop and extend beyond said strip on both said one side and said opposite side of said loop, said opposite side having a plurality of additional holes, a connector screw threadedly engaged in each of said additional holes so as to terminate within said loop, the other two sides of said loop having aligned holes for receiving grounding-wires transversely of said loop, said last-named holes being disposed in aligned pairs equal in number to said additional holes so that said connector screws may intersect wires passing through said last-named holes.

References Cited in the file of this patent

UNITED STATES PATENTS

| | | |
|---|---|---|
| 1,642,345 | Telford | Sept. 13, 1927 |
| 1,721,365 | Zwetsch | July 16, 1929 |
| 1,754,601 | Borden | Apr. 15, 1930 |
| 1,818,380 | Cartier | Aug. 11, 1931 |
| 2,232,857 | Jackson | Feb. 25, 1941 |
| 2,276,818 | Bellows | Mar. 17, 1942 |
| 2,389,261 | Lang | Nov. 20, 1945 |
| 2,509,768 | Hill | May 30, 1950 |
| 2,710,381 | Monson | June 7, 1955 |